Patented Feb. 5, 1929.

1,700,814

UNITED STATES PATENT OFFICE.

MAXIMILIAN PAUL SCHMIDT, OF BIEBRICH-ON-THE-RHINE, AND OTTO HERRMANN, OF MAINZ, GERMANY, ASSIGNORS TO GRASSELLI DYESTUFF CORPORATION, OF NEW YORK, N. Y., A CORPORATION OF DELAWARE.

ISATIN DERIVATIVE AND PROCESS OF MAKING SAME.

No Drawing. Application filed September 13, 1926, Serial No. 135,280, and in Germany June 6, 1925.

Our present invention relates to new isatin derivatives and to a process of preparing the same.

For the preparation of indigoid dyestuffs containing the indol residue linked in alpha position, there were hitherto used isatin-alpha-chlorides or isatin-alpha-anilides by causing them to react with a compound containing a CH=C.CH— or $CH_2$—CO group. The condensation in question has, in most cases, to be effected in presence of an organic solvent or condensing agent, such, for instance as acetic acid anhydride.

Now we have succeeded in preparing a new class of isatin derivatives which are soluble in water and which can be combined in an aqueous solution with a reactive ketomethylene compound, such as naphthol, oxythionaphthene, indoxyl, acenaphthenone or the like, so as to give indigoid dyestuffs.

The said new condensable isatin compounds are produced for instance by the action of sulfites upon isatin-alpha-chlorides, their substitution products, homologues or analogues preferably the isatin-alpha-chloride is suspended in an aqueous solution of sodium sulfite of, for intsance, 10% strength and slowly heated to about 90° C. while stirring, the chloride gradually dissolves and the reaction product may be separated from the solution by salting out with, for instance sodium chloride. They may also be obtained from the dehydroindigo bisulfites described by Kalb (see Berichte der deutschen chemischen Gesellschaft vol. 42, page 3653 ff). This author has already made the observation that the dehydroindigo bisulfites are very apt to decompose in alkaline solution with separation of the corresponding indigo. He recovered for instance from dehydroindigo bisulfite by treating it with caustic soda solution in the cold, a quantity of indigo amounting to about half of that of the theory and moreover a colorless solution which chiefly contained anthranilic acid.

By our own researches we have now found that the decomposition of dehydroindigo bisulfite and its derivatives may also be conducted in such a manner that besides the indigo in question (i. e. half of the theory) the same condensable isatin compounds are obtained as are produced by the action of sulfites upon isatin-alpha chlorides. This result is obtained by treating the dehydroindigo bisulfite compounds by means of weakly alkaline agents. For this purpose it is not necessary to isolate previously the dehydroindigo bisulfite compounds produced by reaction of dehydroindigo acetates with sulfites, but they may immediately be further decomposed in solution whereby it is possible to obtain the water-soluble isatin derivatives directly from the dehydroindigo acetates.

The new compounds contain in the molecule two sulfur atoms to one nitrogen atom. Their structural formula could not as yet be definitely determined; probably they correspond to the general formula:

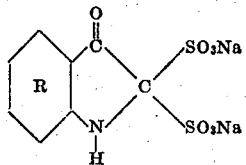

wherein R may be substituted. They readily crystallize in the form of radially arranged yellow needles. They resist well the action of dilute acids even in the heat. They are decomposed by concentrated mineral acids and then chiefly form the corresponding indigo. They are also unstable in a stronger alkaline solution but are not transformed into indigo as is the case with the dehydroindigo sulfites, there are rather generally obtained on acidifying their alkaline solutions the corresponding isatins. On addition of caustic soda solution to their solutions the latter assume temporarily a characteristic red color.

The new compounds differ from the already known bisulfite addition-products by their intense yellow coloration and by their fastness to dilute acids. When spread in solution upon a support for instance upon paper, and exposed to light, they are decomposed.

The following examples illustrate our invention, but are not intended to limit it thereto, the parts indicated being by weight:

1. 5-chlorisatin-alpha-chloride having the probable formula:

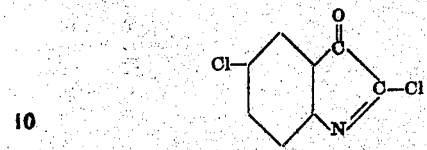

prepared in the usual manner from 18,2 parts of 5-chlorisatin, is suspended in 250 cc. of a solution of sodium sulfite of 10% strength and slowly heated to 90° C., while stirring. The chloride gradually disappears leaving a yellow solution from which any small quantity of dark-colored impure matter is filtered off by suction. By saturation with sodium chloride the reaction-product may be separated therefrom in the form of its yellow-colored sodium salt, this sodium salt readily dissolves in water with a greenish fluorescence and is obtained in the form of clustered needles it corresponds probably to the following formula:

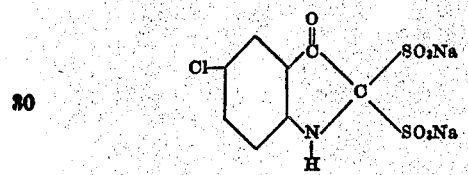

When boiled with an alkali and subsequently acidified the obtained compound is converted into chlorisatin with splitting off of sulfurous acid. If to its aqueous solution a caustic alkali is added, the solution temporarily assumes a characteristic intense reddish-violet color. Unlike the already known β-sulfite compound of the chlorisatin, which is split up by a dilute acid already in the cold, the new compound is fast to dilute acids even in the heat. By concentrated sulfuric acid and hydrochloric acid the compound is decomposed in the heat chiefly with formation of 5-5'-dichlorindigo having the probable formula:

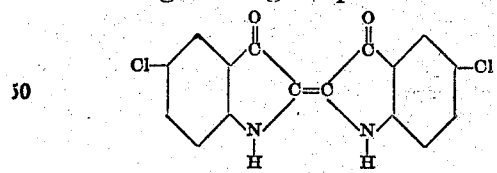

By reduction with hydrosulfite in alkaline solution, the new compound is transformed into the leuco compound of the dichlorindigo. When an aqueous solution of the compound is spread on paper, this solution decomposes when exposed to light.

If the compound is condensed with α-naphthol in a soda-alkaline solution the 2-naphthalene-2-chlorindol-indigo is obtained.

In an analogous manner other isatines, for instance dibromisatin may be transformed into water-soluble α-derivatives.

2. 30 parts of the sodium salt of the dehydroindigobisulfite corresponding probably to the formula:

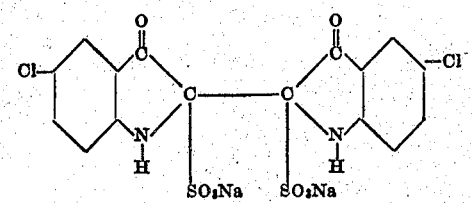

are suspended in 150 cc. of hot water and then mixed at 90° C., while stirring, with a concentrated solution of about 10 grams of sodium carbonate. Stirring is continued until the formation of the indigo is complete. The excess of sodium carbonate is then removed by adding a small quantity of hydrochloric acid and the liquid is separated by filtration from the isolated indigo while hot. By salting out the filtrate with common salt, the sodium salt of the new isatin derivative crystallizes out in the form of yellow needles.

The compound thus obtained is somewhat more readily soluble than the dehydroindigo bisulfite. When treated with an alkali, no indigo can be recovered therefrom and it shows also in other respects the same typical reactions as the chlorisatin derivative produced according to Example 1.

3. 30 parts of the sodium salt of the tetrabromodehydroindigo bisulfite corresponding probably to the formula:

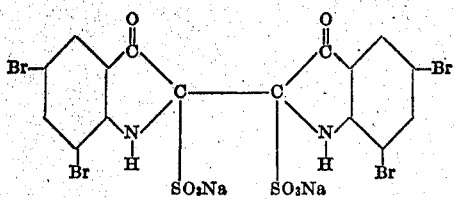

(see Kalb Berichte der deutschen chem. Gesellschaft vol. 42, page 3661) are dissolved in 200 cc. of hot water and, after addition of 10 grams of sodium sulfite warmed on the water-bath for 2-3 hours. The tetrabrom indigo is then filtered off by suction and the sodium salt of the dibromisatin derivative is isolated by salting it out with common salt. This sodium salt is readily soluble in hot water and crystallizes out on cooling in the form of coarse needles. The compound so obtained shows the same characteristic properties as the chlorisatin derivative described in Example 1. It can be converted into dibromisatin by a careful treatment with an alkali and subsequent acidification. It is identical with the dibromisatin derivative obtainable by subjecting dibromisatin chloride to reaction with a sulfite according to Example 1.

We claim:

1. As new products, the sulfite-derivatives of an isatin, containing in the molecule two sulfurous acid residues; being fast to dilute acids, showing an intense yellow coloration and being further characterized by the fact that on mixing their solutions with a caustic alkali these solutions assume an intense red coloration without there being any formation of indigo corresponding probably to the general formula:

wherein R may be substituted.

2. As a new process, the preparation of a water-soluble isatin-alpha-derivative, which consists in causing a sulfite to act upon an isatin-alpha-chloride.

3. The process of preparing a water-soluble isatin-alpha-derivative, which consists in causing sodium sulfite to act upon an isatin-alpha chloride.

4. As a new product the compound of the probable formula:

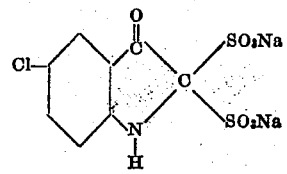

which forms yellow-colored needles, being readily soluble in water, with a greenish fluorescence.

5. The process which comprises suspending an isatin-alpha-chloride in an aqueous solution of sodium sulfite of about 10% strength and heating the solution while stirring to about 90° C. until the isatin chloride has dissolved.

In testimony whereof, we affix our signatures.

MAXIMILIAN P. SCHMIDT.
OTTO HERRMANN.